Jan. 12, 1943.  H. FRUEHAUF  2,308,446
VEHICLE-SEAT SUSPENSION
Filed Feb. 12, 1940  2 Sheets-Sheet 1
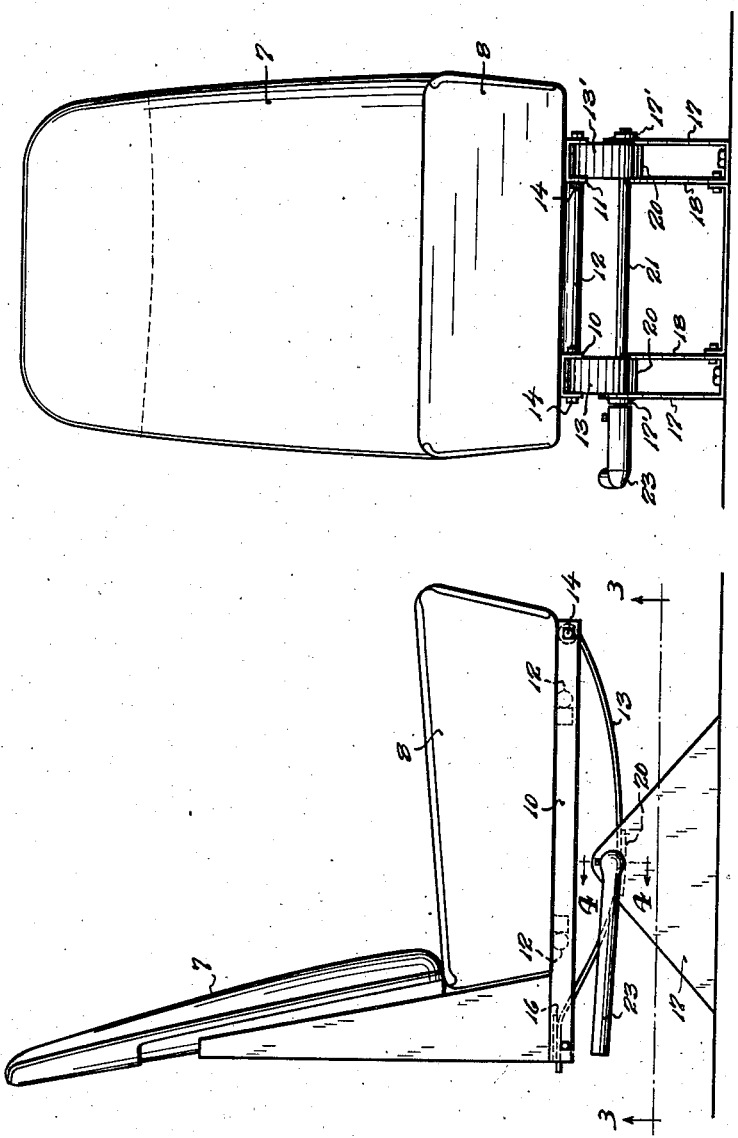
INVENTOR
Herman Fruehauf
BY
ATTORNEY Jan. 12, 1943. H. FRUEHAUF 2,308,446
VEHICLE-SEAT SUSPENSION
Filed Feb. 12, 1940 2 Sheets-Sheet 2
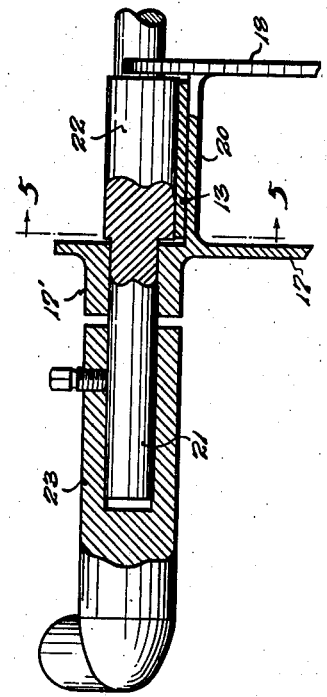
Fig. 4.
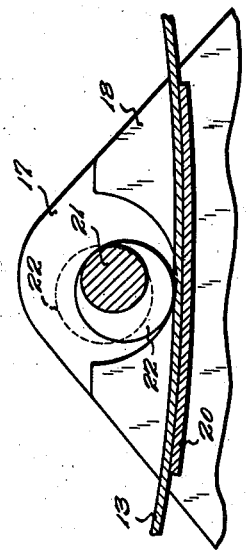
Fig. 5.
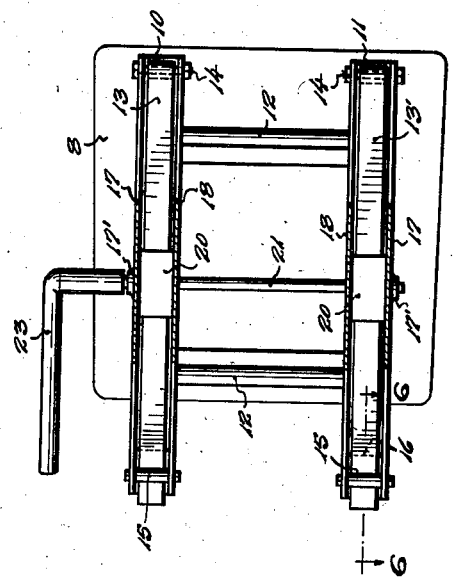
Fig. 3.
Fig. 6.
INVENTOR
Herman Fruehauf
BY
ATTORNEY Patented Jan. 12, 1943

2,308,446

UNITED STATES PATENT OFFICE 2,308,446

VEHICLE SEAT SUSPENSION

Herman Fruehauf, Seattle, Wash., assignor to Kenworth Motor Truck Corporation, Seattle, Wash., a corporation of Washington Application February 12, 1940, Serial No. 318,486

2 Claims. (Cl. 155—9)

This invention relates to vehicle-seat construction, and for its object aims to provide a shock-proofed seat employing leaf-type springs as the shock-cushioning agent and, more particularly, to provide a seat wherein the employed leaf springs are applied in a manner permitting a most simple and effective adjustment of the effective springing to meet the requirements of the individual occupant.

The invention, with the foregoing and still further objects and advantages in view, the nature of which will appear in the course of the following description and claims, consists in the novel construction and in the adaptation and combination of parts illustrated in the accompanying drawings and hereinafter described and claimed.

In said drawings:

Figure 1 is a view in side elevation illustrating a vehicle seat constructed in accordance with the present invention, the indicated ground line representing the floor of the driver's compartment of a vehicle to which the seat is applied.

Fig. 2 is a front elevation thereof.

Fig. 3 is a horizontal section on line 3—3 of Fig. 1 to show an underside plan of the seat, the back-rest part of the seat being deleted.

Fig. 4 is a fragmentary transverse vertical section taken to an enlarged scale on line 4—4 of Fig. 1.

Fig. 5 is a fragmentary longitudinal vertical section on line 5—5 of Fig. 4; and Fig. 6 is a fragmentary longitudinal vertical section taken to an enlarged scale on line 6—6 of Fig. 3.

The seat proper is or may be of the usual construction, consisting of a frame on which is carried a back-rest 7 and a load-sustaining seat cushion 8, the frame, as I represent the same, comprising a pair of longitudinally extending and laterally spaced-apart channel bars 10—11 integrally joined by spanners 12.

According to the present invention I employ, for each of the channel bars, a leaf-type spring, as 13 and 13', which at one end is given a pivotal mounting on a bar-traversing pin 14 and, at the opposite end, finds a slide bearing over a roller 15 and against a suitable wear-strap 16. The wear-strap used is desirably composed of a strip of brake lining, leather or the like which functions to yieldingly restrain the free sliding movement of the spring end and, for extending the bearing as between the spring-leaf and the wear-strap, the leaf is modified from a normal semi-elliptical shape in that the free terminus defines a rectilineal line the prolongation of which traverses, or nearly traverses, the pivot pin 14. It should be pointed out, as a mechanical equivalent of the slide mounting for the rear end of the spring leaf, that a shackle as between said rear end and the rear end of the seat-frame functions to the desired end of permitting relative longitudinal movement, which is to say a longitudinal shifting movement of the spring end relative to the frame end.

Carried rigidly by the vehicle body, either with or without provision for longitudinal adjustment, are suitable mounting bases for the respective spring leaves and these mounting bases I indicate as being comprised of paralleling side plates 17—18 bridged short of their upper limits by a horizontal plate 20 to produce a substantial channel accommodating the median part of the spring. On each side plate 17 above the bridging plate 20 are center-bored bosses 17', and extending from one to the other mounting base and journaled through said bosses is a cam shaft 21 on which are cams 22 lying in the vertical planes of the spring leaves and functioning by rotation of the shaft to lock the leaves in selected longitudinally shifted positions relative to the bed-forming plates 20. A crank handle 23 permits manual operation of the cam shaft for operating the cams into and from wedging positions.

The operation is believed clear from the foregoing description taken in connection with the illustration of my now preferred embodiment of the invention. It may be here stated that such illustrated embodiment is one intended for use on commercial vehicles such as trucks, and it is to be understood that refinements from an ornamental and possibly from an operating standpoint may be applied toward adapting the seat to use on other types of vehicles.

What I claim is:

1. In vehicle-seat suspension, in combination: a mounting base providing laterally spaced horizontal bed-plates; a seat-frame comprised of longitudinally extending channels spaced apart a distance corresponding to the spacing between the bed-plates and adapted to lie in elevated vertically aligned relation to the latter; a pair of leaf-type springs, one for each of the frame channels, pivotally coupled at one end to the forward end of the related channel, slidably bearing at its rear end against the underside of the channel, and bearing between said pivoted and sliding ends against the related bedplate, said spring leaves being shiftable lonigtudinally in relation to their base bearing for varying the relative length as between the pivoted and the sliding arms of the leaves; and means operable by an occupant of the seat for locking the springs against movement from their longitudinally adjusted positions.

2. Vehicle-seat suspension according to claim 1, said locking means comprising cam devices functioning by wedge action to lock the springs against movement from their longitudinally adjusted positions.

HERMAN FRUEHAUF.